US007692449B2

(12) United States Patent
Verbauwhede et al.

(10) Patent No.: US 7,692,449 B2
(45) Date of Patent: Apr. 6, 2010

(54) DYNAMIC AND DIFFERENTIAL CMOS LOGIC WITH SIGNAL-INDEPENDENT POWER CONSUMPTION TO WITHSTAND DIFFERENTIAL POWER ANALYSIS

(75) Inventors: Ingrid M. Verbauwhede, Palo Alto, CA (US); Kris J. V. Tiri, Genk (BE)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 12/191,144

(22) Filed: Aug. 13, 2008

(65) Prior Publication Data

US 2009/0039919 A1 Feb. 12, 2009

Related U.S. Application Data

(62) Division of application No. 10/565,551, filed as application No. PCT/US2004/030580 on Sep. 17, 2004, now Pat. No. 7,417,468.

(60) Provisional application No. 60/504,380, filed on Sep. 17, 2003.

(51) Int. Cl.
*H03K 19/00* (2006.01)
*G06F 7/38* (2006.01)
(52) U.S. Cl. .......................... 326/46; 326/93
(58) Field of Classification Search ............... 326/46, 326/82, 93; 327/202, 217
See application file for complete search history.

(56) References Cited

U.S. PATENT DOCUMENTS

| 4,570,084 A | 2/1986 | Griffin et al. |
| 5,909,127 A | 6/1999 | Pearson et al. |
| 6,476,645 B1 * | 11/2002 | Barnes .................. 327/51 |
| 7,417,468 B2 | 8/2008 | Verbauwhede et al. |
| 2004/0008068 A1 | 1/2004 | Kim |
| 2007/0057698 A1 | 3/2007 | Verbauwhede et al. |

FOREIGN PATENT DOCUMENTS

EP    0147598 A1    7/1985

OTHER PUBLICATIONS

Tiri et al., "A Dynamic and Differential CMOS Logic With Signal Independent Power Consumption to Withstand Differential Power Analysis on Smart Cards," ESSCIRC 2002, Proceedings of the 28th European Solid-State Circuit Conference, Sep. 24-26, 2002, Florence, Italy, 2002, pp. 403-406.

(Continued)

*Primary Examiner*—Daniel D Chang
(74) *Attorney, Agent, or Firm*—Knobbe, Martens, Olson & Bear, LLP

(57) ABSTRACT

A dynamic and differential CMOS logic style is disclosed in which a gate uses a fixed amount of energy per evaluation event. The gate switches its output at every event and loads a constant capacitance. The logic style is a Dynamic and Differential Logic (DDL) style. The DDL style logic typically has one charging event per clock cycle and the charging event does not depend on the input signals. The differential feature masks the input value because a precharged output nodes is discharged during the evaluation phase. The dynamic feature breaks the input sequence: the discharged node is charged during the subsequent precharge phase.

3 Claims, 16 Drawing Sheets

OTHER PUBLICATIONS

Huang et al., "New CMOS Differential Logic Circuits for True-Single-Phase Pipelined Systems," Circuits and Systems, 1994, ISCAS 1994, 1994 IEEE International Symposium on London, UK May 30-Jun. 2, 1994, New York, NY, USA, vol. 3, May 30, 1994, pp. 15-18.

Office Action dated May 4, 2007 from Related U.S. Appl. No. 10/565,551.

Office Action dated Jun. 26, 2007 from Related U.S. Appl. No. 10/565,551.

Office Action dated Mar. 19, 2008 from Related U.S. Appl. No. 10/565,551.

Notice of Allowance dated May 2, 2008 from Related U.S. Appl. No. 10/565,551.

* cited by examiner

DYNAMIC AND DIFFERENTIAL CMOS LOGIC WITH SIGNAL-INDEPENDENT POWER CONSUMPTION TO WITHSTAND DIFFERENTIAL POWER ANALYSIS

REFERENCE TO RELATED APPLICATIONS

The present application is a divisional of U.S. application Ser. No. 10/565,551, filed Sep. 11, 2006, titled "DYNAMIC AND DIFFERENTIAL CMOS LOGIC WITH SIGNAL-INDEPENDENT POWER CONSUMPTION TO WITHSTAND DIFFERENTIAL POWER ANALYSIS", now U.S. Pat. No. 7,417,468, which is a §371 National Phase of International Patent Application No. PCT/US2004/30580, filed Sep. 17, 2004, titled "A DYNAMIC AND DIFFERENTIAL CMOS LOGIC WITH SIGNAL-INDEPENDENT POWER CONSUMPTION TO WITHSTAND DIFFERENTIAL POWER ANALYSIS", which claims priority benefit of U.S. Provisional Application No. 60/504,380, filed Sep. 17, 2003, titled "A DYNAMIC AND DIFFERENTIAL CMOS LOGIC WITH SIGNAL INDEPENDENT POWER CONSUMPTION TO WITHSTAND DIFFERENTIAL POWER ANALYSIS FOR SMART CARDS," the entire contents of which is hereby incorporated by reference.

GOVERNMENT INTEREST STATEMENT

This invention was made with Government support of Grant No. 0098361, awarded by the NSF. The Government has certain rights in this invention.

BACKGROUND

1. Field of the Invention

The present invention relates to logic and methods for signal-independent power consumption to withstand differential power analysis and other side-channel attacks.

2. Description of the Related Art

Electronic banking, e-commerce, virtual private networks and so on cannot operate without encryption technology and a secure implementation of the encryption technology. To obtain security, many strong encryption algorithms have been developed. While usually strong against mathematical attacks, Side Channel Attacks (SCAs) can reveal the secret key through information leaked by the hardware implementation of the encryption module. Differential Power Analysis (DPA) is based on the fact that logic operations have power characteristics that depend on the input data. Statistical analyses of measured power traces can be used to link the switching activities of the circuit to the secret key.

Different techniques have been tried to prevent this information leakage. On the algorithmic level, random process interrupts interleave dummy instructions to avoid sequential execution of the algorithm. Integration techniques, however, are able to resynchronize the power traces. Masking is a technique that prevents intermediate variables from depending on the knowledge of an easily-accessible subset of the secret key. DPA has been modified to handle masking. On the architectural level, techniques include adding random power consuming operations and duplicating logic with complementary operations. These procedures merely lower the side channel information and might easily be disabled through tampering. Active power signal filtering with power consumption compensation, passive filtering, battery on chip and a detachable power supply influence the power transfer itself The first method lags behind the fast power fluctuations and physical dimensions limit the latter three.

None of the above methods provide satisfactory protection against attacks based on DPA.

SUMMARY

The present invention solves these and other problems by providing logic whose power consumption is relatively independent of the logic transitions. In one embodiment, logic values are measured by charging and discharging capacitors using a relatively fixed amount of energy for each transition. In one embodiment, even though different capacitances are switched, the logic style provides the property of charging in every cycle a total capacitance with a constant value.

In one embodiment, a Sense Amplifier Based Logic (SABL) achieves this goal by switching the output independently of the input sequence and by having a relatively constant load capacitance equal to all internal nodes combined with one of the balanced output loads. In SABL, the combination of dynamic and differential logic shares a capacitance for the output transitions. In one embodiment, SABL makes the output events equal by charging at every event the same capacitance value: one of the balanced load capacitances and the sum of all the internal node capacitances.

In one embodiment, the SABL gate is realized by providing a sense amplifier half of a flip-flop and replacing an input differential pair by a Differential Pull Down Network (DPDN). In one embodiment, the DPDN 403 is implemented such that for a stable input combination nodes that are internal to the DPDN 403 connect to one of the output nodes. During evaluation (clock high) the cross-coupled inverter will toggle to one state and provide a stable output as soon as the DPDN 403 provides a path to ground. A first transistor, which is always on, prevents a floating node by serving as a path for sub-threshold currents. In addition, in case of the SABL gate, the first transistor provides that all internal nodes discharge. Regardless of which branch is on, all internal nodes and their respective capacitances are connected through the first transistor and will eventually be discharged together with one of the output nodes. The differential output nodes connect differential signals to a differential input. Therefore, the total output capacitance, including the equal intrinsic output capacitances, one of the symmetrical interconnect capacitances and one of the symmetrical input capacitances, is a constant. During precharge (clock low) the discharged nodes and capacitances will be precharged. Thus, the same capacitances are discharged and charged, making the power consumption of the gate relatively independent of the input statistics.

In one embodiment, a basic p-gate is implemented as a gate that precharges to ground (GND) when clock is high and evaluates one node to VDD through a DPUN when clock is low.

In one embodiment, a combination of a p-SA and an n-SA, acts as a master-slave flip-flop. The p-SA evaluates at the falling edge of clock and keeps this value till the rising edge, while the n-SA evaluates at the rising edge of clock and keeps this value till the falling edge. As a result, the value is stored during one clock cycle.

In one embodiment, the gate switches its output at every event and loads a constant capacitance. The logic style is a Dynamic and Differential Logic (DDL) style. The DDL style logic typically has one charging event per clock cycle and the charging event does not depend on the input signals. The differential feature masks the input value because a precharged output nodes is discharged during the evaluation phase. The dynamic feature breaks the input sequence. The discharged node is charged during the subsequent precharge phase.

In one embodiment, a differential pull down network (DPDN) is used such that every charging event the same capacitance value is charged. The capacitance value includes one of the balanced output capacitances and the sum of the internal node capacitances. The capacitances at the differential output nodes are balanced as all its components, which are the intrinsic output capacitances, the interconnect capacitances and the input capacitances, can be balanced, assuming a careful layout. The DPDN is designed such that, for a stable input combination during the evaluation phase, all nodes that are internal to the DPDN connect to one of the output nodes of the DPDN. As a result, since both output nodes of the DPDN eventually discharge, all the internal nodes are discharged and will be charged during the subsequent precharge phase.

In one embodiment, the logic style is fully elaborated: logic gates, combinatorial logic and sequential logic can be implemented. Combinatorial logic can be built using either Domino or np-logic. Sequential logic can be implemented with additional dummy circuitry that switches when the actual flip-flop doesn't switch or with a master-slave flip-flop that stores the value during the precharge phase.

DETAILED DESCRIPTION

Figure 1:
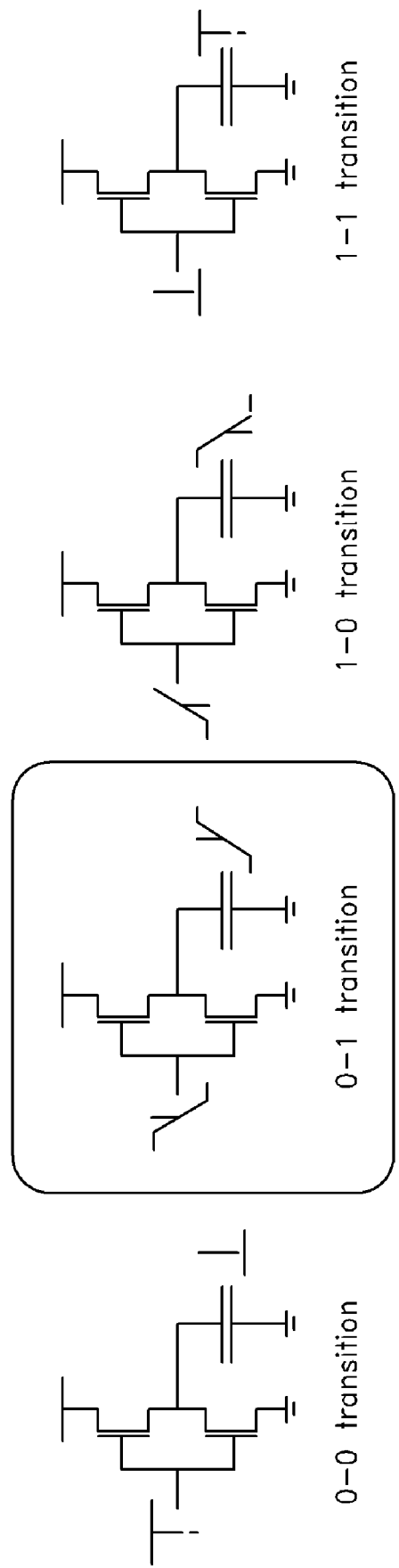
FIG. 1 shows the asymmetric output transitions of standard Static Complementary CMOS logic (scCMOS).

As shown in FIG. 1, Static Complementary CMOS logic (scCMOS), which is the default logic style in standard cell libraries used for security ICs only consumes energy from the power supply when its output has a 0-1 transition. During the 1-0 transition, the energy previously stored in the output capacitance is dissipated. In the two degenerated events of 0-0 or a 1-1 transition no power is used. This asymmetric power profile provides the information used in DPA to find the secret key.

The logic style disclosed herein with data-independent power consumption does not reveal this information. In one embodiment, logic values are measured by charging and discharging capacitors using a fixed amount of energy for every transition. In one embodiment, even though different capacitances are switched, the logic style provides the property of charging in every cycle a total capacitance with a constant value. The disclosed Sense Amplifier Based Logic (SABL) achieves this goal by (1) switching the output independently of the input value independently of the input sequence and by (2) having a relatively constant load capacitance equal to all internal nodes combined with one of the balanced output loads.

Figure 2:
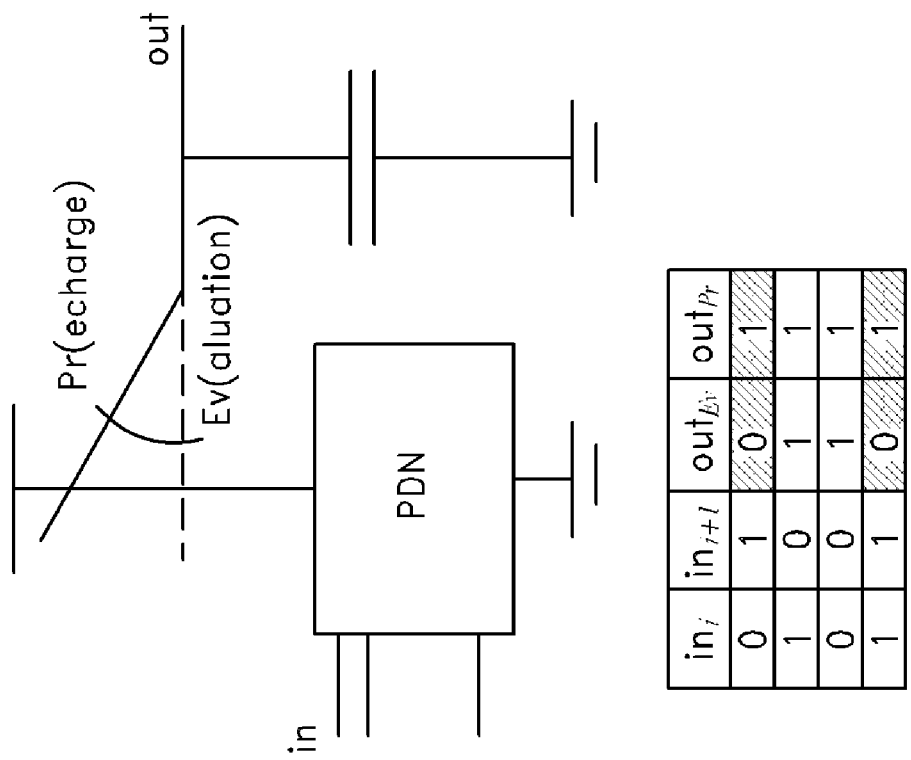
FIG. 2 shows the output events for differential logic and for dynamic logic.
Figure 2:
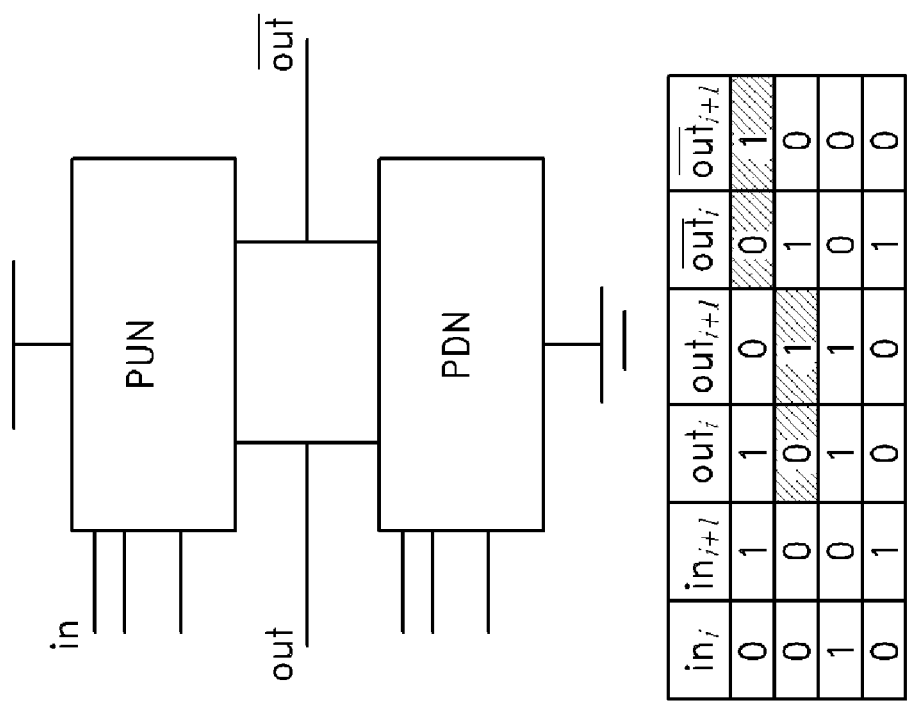

In SABL, the combination of dynamic and differential logic shares a capacitance for the four output transitions (0-0, 0-1, 1-0, 1-1). FIG. 2 shows the output events for differential logic and for dynamic logic separately. A differential logic masks the input value. Energy is dissipated when exactly one output node is discharged. Therefore, there is no difference between 0-1 and a 1-0 event or between a 0-0 and a 1-1 event. However, one can still differentiate between those two main classes because a 0-1/1-0 transition will consume power whereas a 0-1/1-1 does not. This is the main reason that addressing the power attack solely by balancing the Hamming weights does not succeed. Whether it is done on algorithmic level (e.g., exclusively handling bytes with Hamming weight 4), architecture level (e.g., duplicating the module with a complementary module) or logic level (e.g., differential logic), this difference will remain present.

A dynamic logic breaks the input sequence: independent of the input-switching behavior, energy is consumed when the load capacitance is charged. Therefore there is no difference between a 0-0 and a 1-0 event or between a 1-1 and a 0-1 event. Here, only the 0-1/1-1 transition consumes power during the following precharge phase. Thus, it is useful to combine the two into one dynamic differential logic style that switches the output independently of the input value or sequence.

Figure 3:
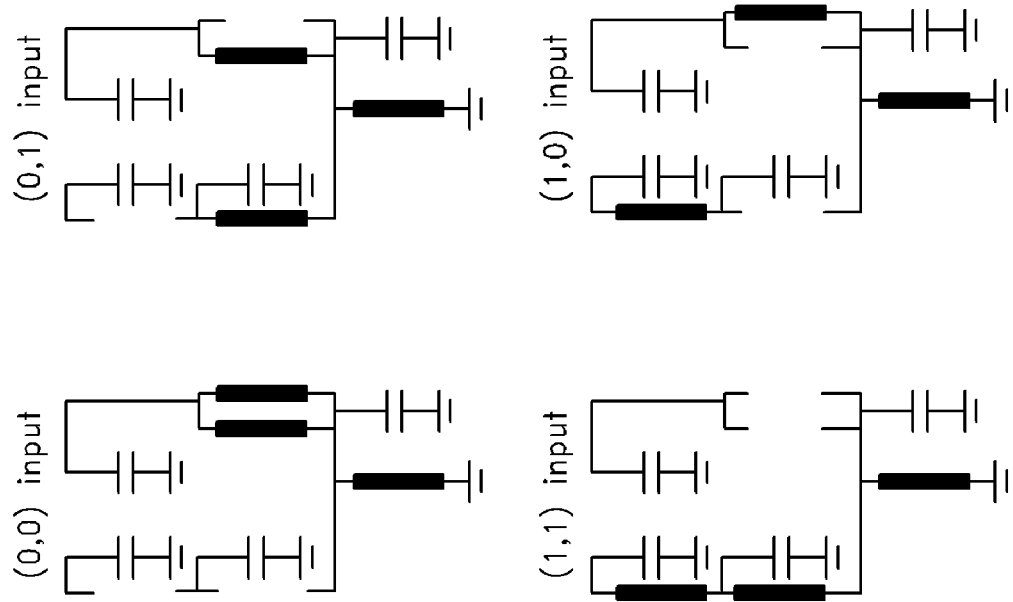
FIG. 3 shows the DCVSL AND-NAND gate.
Figure 3:
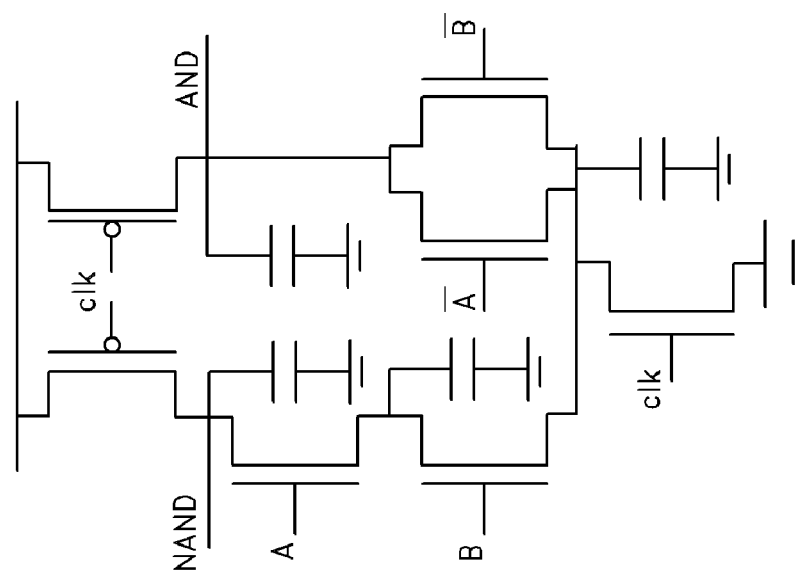

Merely making it dynamic and differential is not sufficient, however, as it makes the four transitions equal but only to the first order. This is shown for the dynamic DCVSL style. The DCVSL inverter has a uniform power consumption. Simulations show a variation smaller than 1%. But for more complicated logic functions this number will not be accurate. FIG. 3 shows the DCVSL AND-NAND gate, for which simulations indicate that the difference can be as large as 50%. This is caused by asymmetry in the gate. Depending on the input, different parasitic capacitances discharge during the evaluation phase. In the succeeding power consuming precharge phase, these capacitances are recharged. In none of the four different events is the same combination of capacitances charged.

SABL makes the four output events equal, by charging at every event the same capacitance value: one of the balanced load capacitances and the sum of all the internal node capacitances.

Figure 4A:
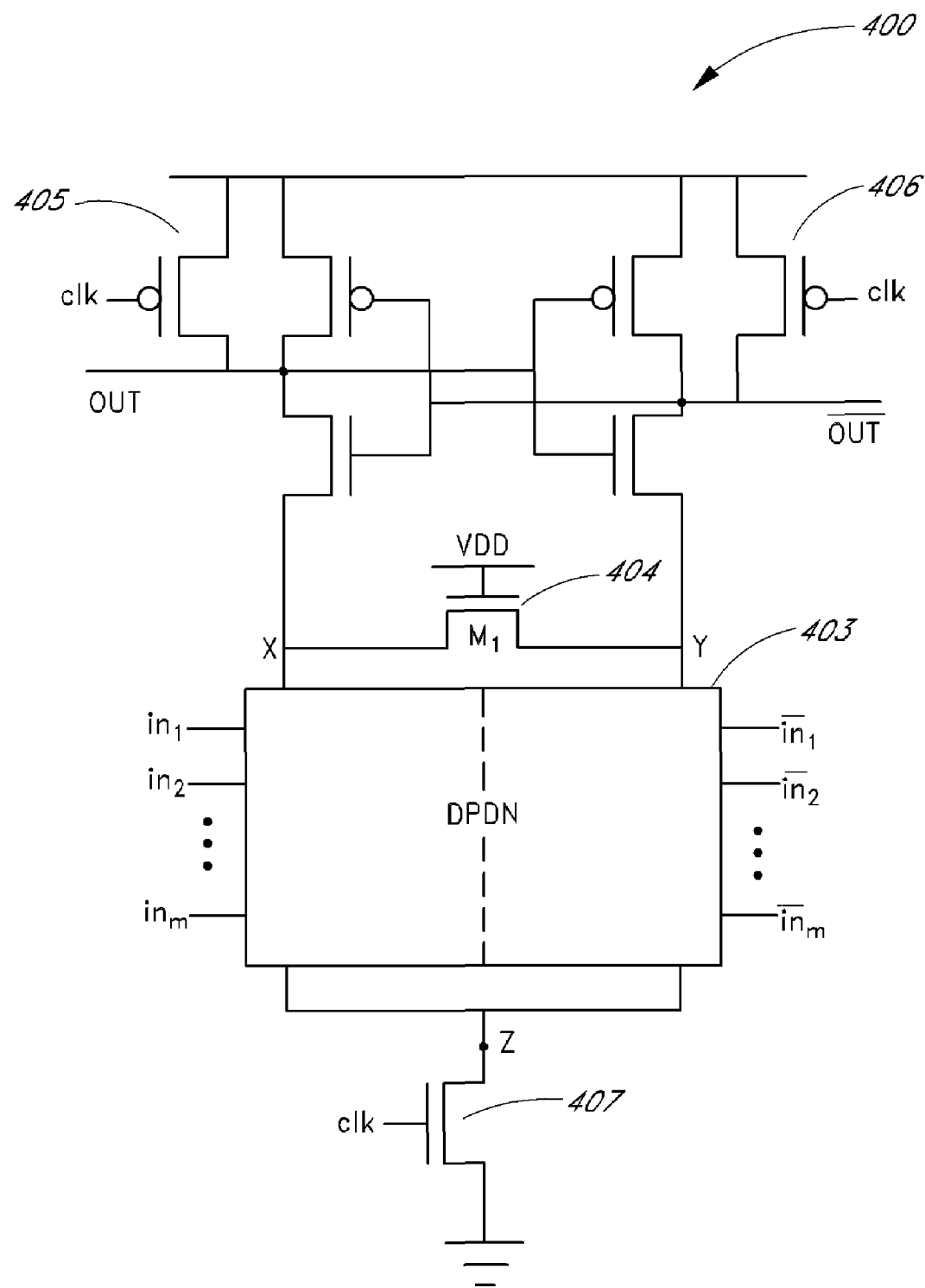
FIG. 4A shows the SABL n-gate.
Figure 4B:
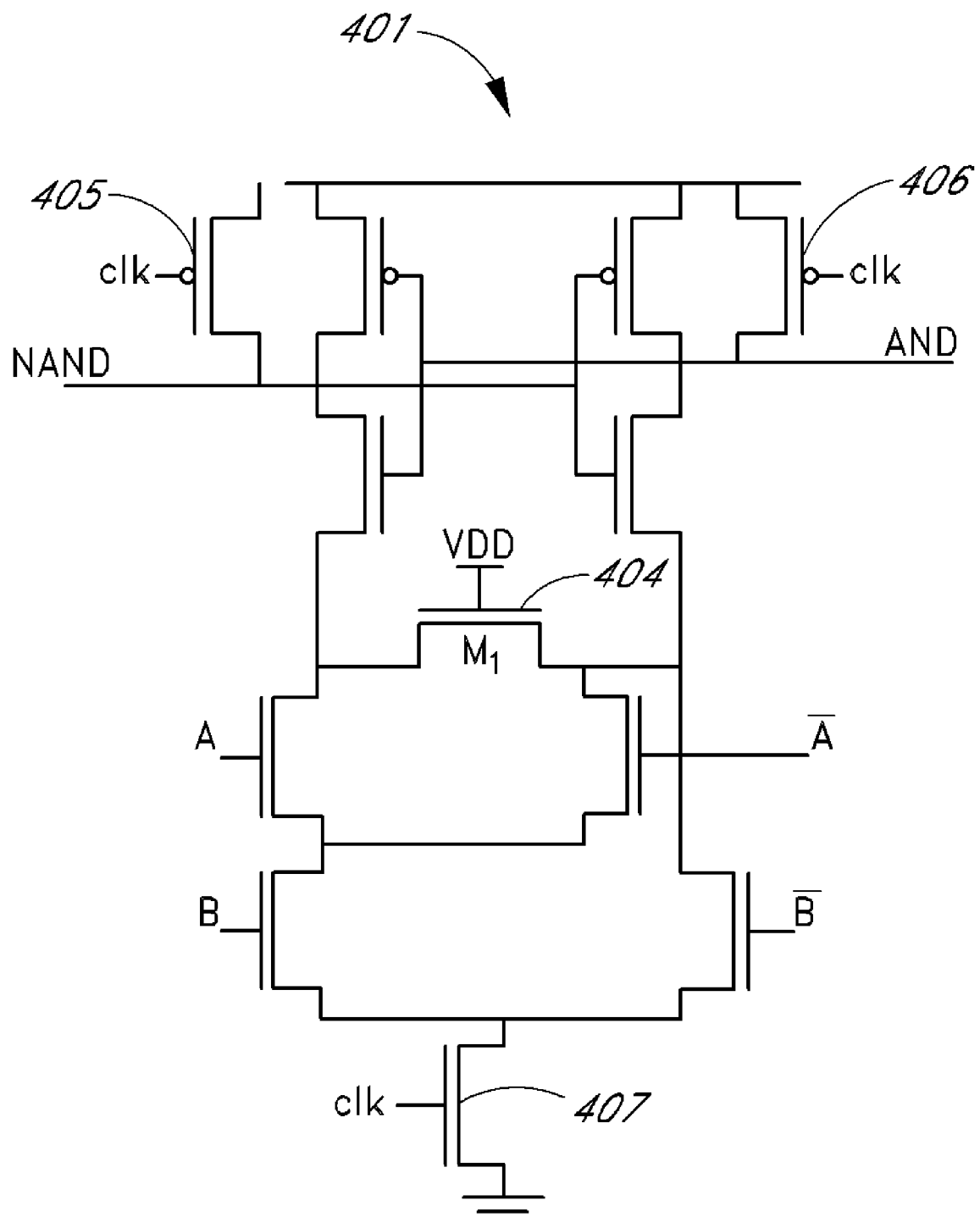
FIG. 4B shows the SABL AND-NAND gate.

FIG. 4A shows a basic SABL n-gate. FIG. 4B shows an SABL AND-NAND n-gate. In one embodiment, the SABL gate is based on the StrongArm 110 flipflop (SAFF). To realize a basic gate, the sense amplifier half of the flip-flop is kept, and the input differential pair is replaced by a Differential Pull-Down Network (DPDN) 403 having outputs X and Y. The DPDN 403 is implemented such that for a stable input combination nodes that are internal to the DPDN 403 connect to one of the output nodes. The DPDN is pulled to ground by a clocked transistor 407. During evaluation (clock high) the cross-coupled inverter will toggle to one state and provide a stable output as soon as the DPDN 403 provides a path to ground. Two clocked transistors 405, 406 precharge the outputs and the related internal nodes. A gate of a transistor $M_1$ 404 is provided to VDD. A drain and source of the transistor 404 are provided to respective outputs of the DPDN 403.

The transistor $M_1$ 404, which is always on, prevents a floating node by serving as a path for subthreshold currents. The transistor $M_1$ 404 guarantees that all internal nodes discharge. Regardless of which branch is on, all internal nodes and their respective capacitances are connected through $M_1$ 404 and will eventually be discharged together with one of the output nodes. The differential output nodes connect differential signals to a differential input. Under the assumption that the differential signals travel in the same environment, the interconnect capacitances are equivalent. Therefore, the total output capacitance, including the equal intrinsic output capacitances, one of the interconnect capacitances and one of the symmetrical input capacitances, is a constant. During precharge (clock low) all the discharged nodes and capacitances will be precharged. As such every cycle the same capacitances are discharged and charged what makes the power consumption of the gate independent of the input statistics.

As shown in FIG. 4A, in one embodiment, to realize the SABL n-gate from a StrongArm, one keeps the Sense Amplifier half (SA) of the SAFF and replaces the input differential pair by a differential pull down network (DPDN) 403. The DPDN 403 has two branches, which for a stable differential input combination connect one of the output nodes X and Y of the DPDN 403 to the common node Z.

During the precharge phase (clock-signal low), node Z is disconnected from ground and the output nodes and nodes X and Y are precharged to VDD and VDD-$V_t$ respectively, where $V_t$ is the threshold voltage. During the evaluation phase (clock-signal high), the cross-coupled inverter will toggle and provide a stable output as soon as a branch of the DPDN 403 provides a path to ground. When node X is connected to node Z, node out becomes '0', while node $\overline{out}$ out remains at '1'. When node Y is connected to node Z, node $\overline{out}$ becomes '0'.

Transistor $M_1$ 404, provides static operation during the evaluation phase. Even if the input to the differential pair changes after the SA has toggled, the '0' output node is always connected to ground. The inputs to the SABL gate 400 however, do not change after their initial transition, as they come from stable outputs of previous SABL gates. In our design, $M_1$ serves to discharge both external nodes X and Y of the DPDN 403. Whichever branch of the DPDN 403 is on, both nodes are connected through $M_1$ and will eventually be discharged together with one of the output nodes. During the precharge phase, all the discharged nodes and capacitances are charged.

Once the SABL gate has toggled, it benefits from static operation. All nodes are connected either to VDD or to ground and there are no dynamic nodes that are noise sensitive and suffer from charge leakage.

The capacitances at the differential output nodes are balanced as all its components, which will be the intrinsic output capacitances, the interconnect capacitances and the input capacitances, can be balanced by a careful layout. To control the contribution of the parasitic capacitances at the internal nodes of the DPDN, however, a special DPDN 503 is described below.

Figure 5:
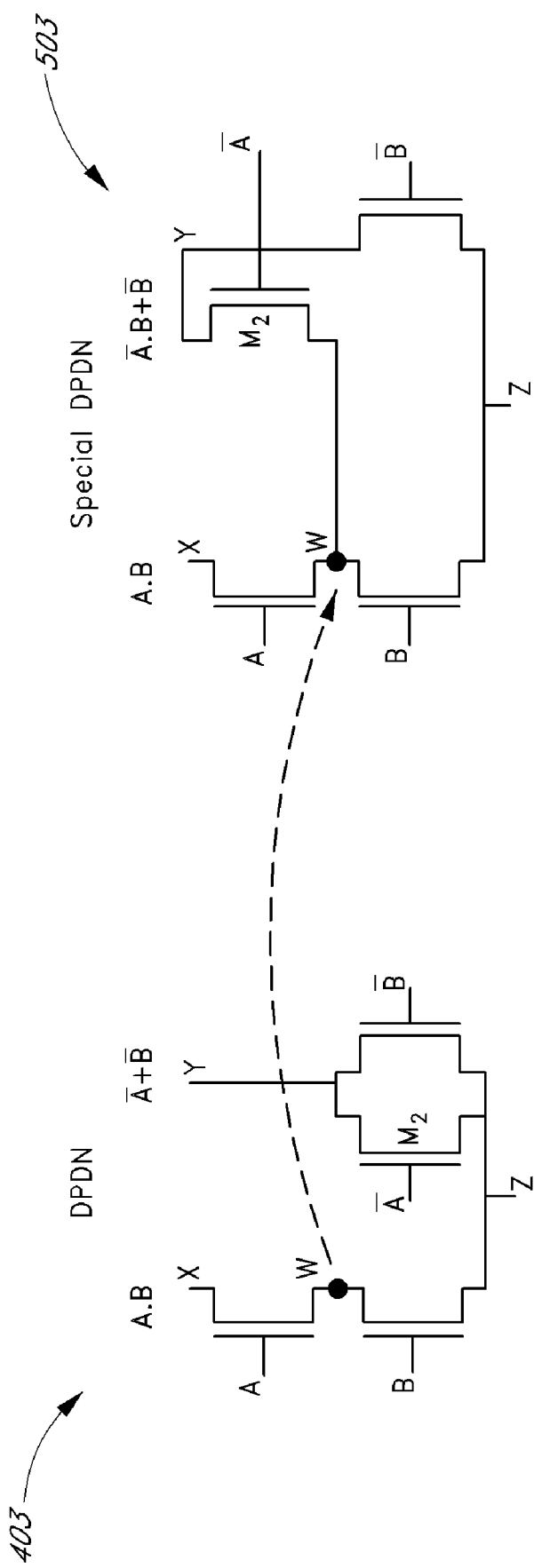
FIG. 5 shows the transformation of a DPDN to a special DPDN used in SABL.

FIG. 5 shows the transformation of a DPDN 403 to a special DPDN 503 for use in the SABL. The original network 403 has one internal node, node W, which possibly becomes floating depending on the input combination. Repositioning transistor $M_2$, which is located between nodes Y and Z and is driven by input A, between nodes Y and W does not alter the functionality of the DPDN but guarantees that for any differential input node W is connected to one of the output nodes.

The special DPDN 503 is designed such that for a differential input internal nodes are connected to one of the external nodes. As a result, since both external nodes X and Y eventually discharge, the internal nodes are discharged and are charged together with one of the balanced output loads during precharge. For a stable input combination during evaluation phase nodes that are internal to the DPDN 503 connect to one of the output nodes of the DPDN 503. As a result, since both output nodes of the DPDN 503 eventually discharge, the internal nodes are discharged and will be charged during the subsequent precharge phase. That means that SABL charges every cycle the same capacitance value: one of the balanced load capacitances and the sum of all the internal node capacitances. And hence SABL has signal-independent power consumption.

In general, any DPDN 403 can be transformed into the special DPDN. The transformation exploits the fact that in a DPDN, each branch is the dual of the other and that two networks can either be connected in series, which is an AND connection, or in parallel, which is an OR connection. In a DPDN, one branch is thus a series network, x·y, and the other a parallel network $\overline{x}+\overline{y}$. Of these two networks, only the one in series has an internal node. Changing the parallel connection into $\overline{x}\cdot y+\overline{y}$, putting network y at the bottom of the x·y connection and sharing network y between the two branches x·y and $\overline{x}\cdot y+\overline{y}$, transforms the DPDN 403 into one that connects the internal node of the series connection to the output node.

Figure 6:
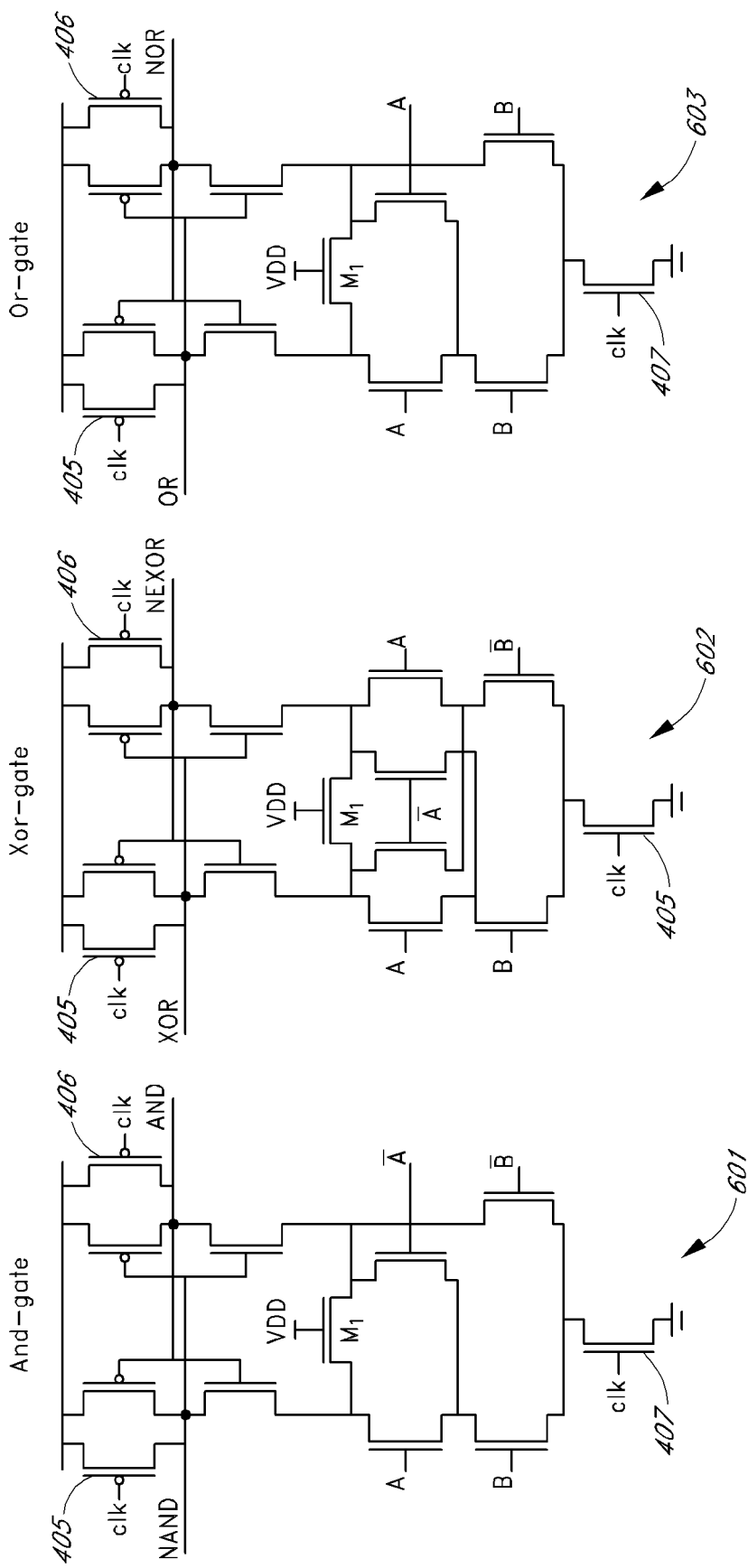
FIG. 6 shows SABL AND, XOR, and OR gates.

FIG. 6 shows different SABL gates: an AND gate 600, an XOR gate 601, and an OR gate 603.

Figure 7:
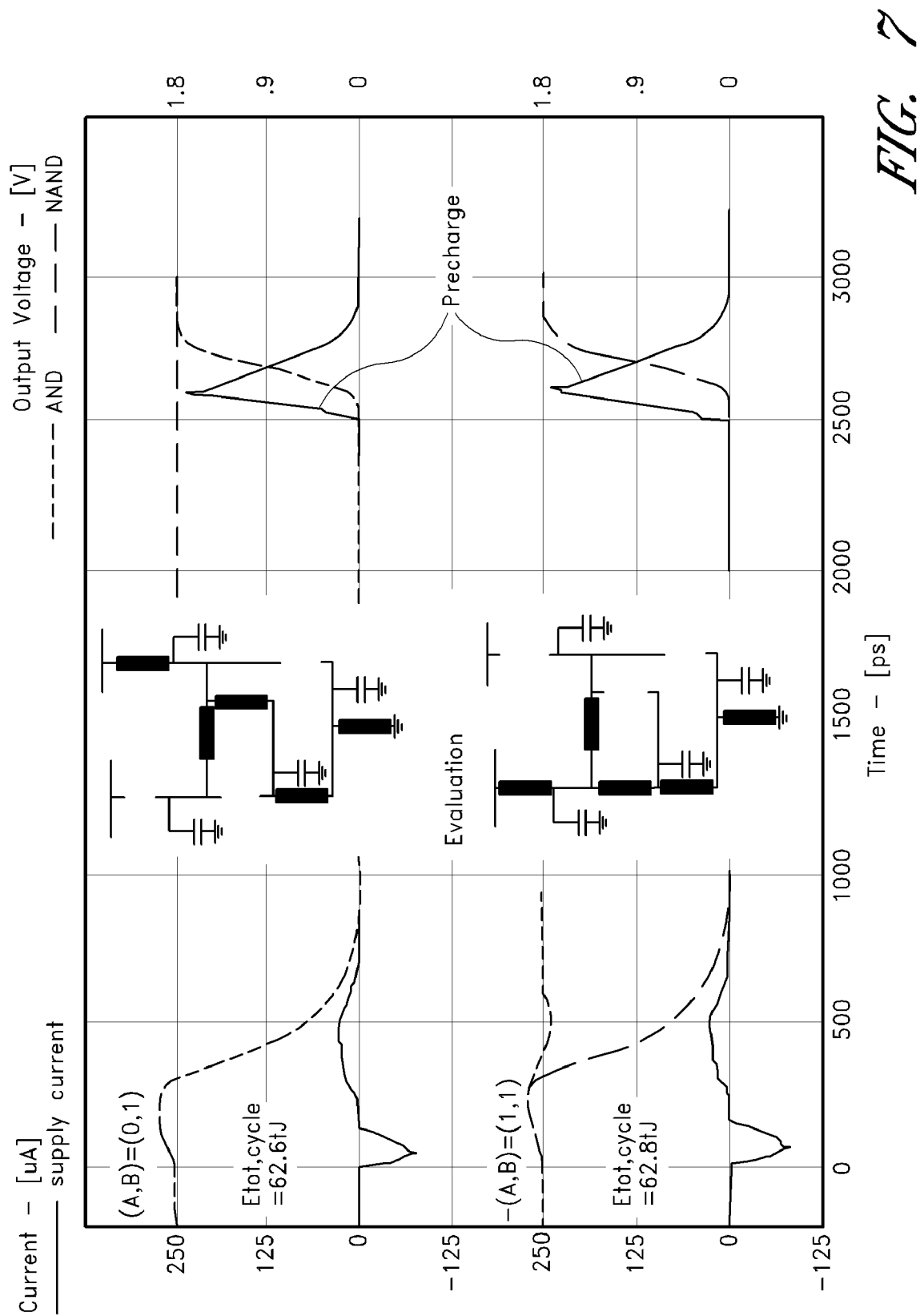
FIG. 7 shows the discharging and charging events of the AND-NAND n-gate for different inputs.

FIG. 7 shows the transient HSPICE simulation of discharging and charging events of the AND-NAND n-gate for different inputs. The figure shows that for both events all the internal node capacitances and one of the balanced output nodes are (dis)charged. In each event, the same amount of charge, and hence the same amount of energy, is used. Furthermore, the same amount of charge is going through very similar discharge paths, which results in a constant delay and instantaneous current.

Figure 8:
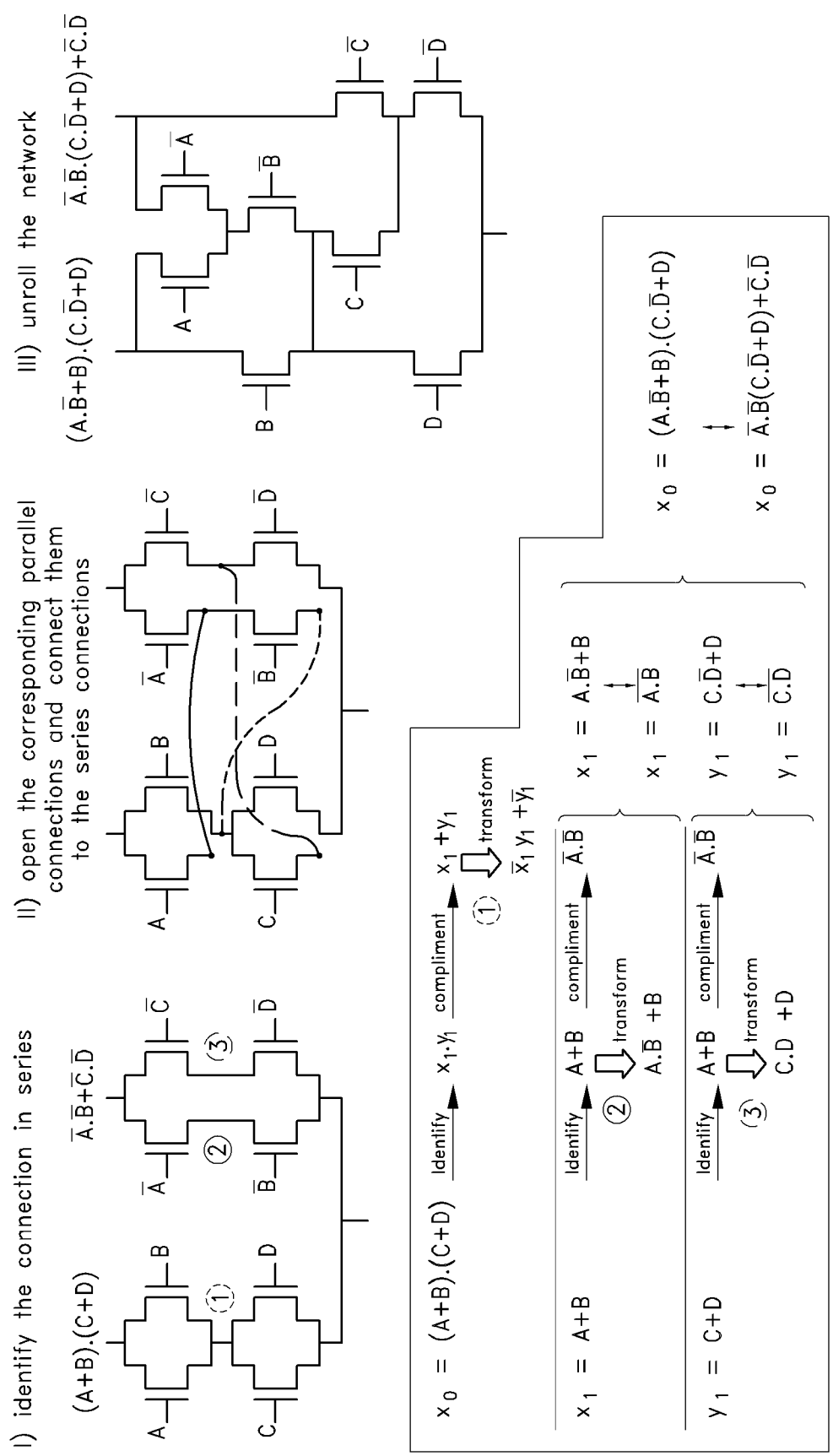
FIG. 8 shows a design methodology.

FIG. 8 shows the design methodology. The design goal is to assure that all internal nodes are connected to one of the external nodes for a differential input. The design procedure is a transformation that repositions transistors in the DPDN. As a result, the total number of devices remains the same. The total evaluation depth may increase.

The design procedure of creating a special DPDN for a logical function $f$ can be described in terms of five steps:

1. Identify two expressions x and y that combine to the logical function $f$. This results in an AND-operation, x·y, or an OR-operation, x+y.

2. Complement the expression in x and y to get the dual expression of $\overline{f}$. This results in an OR-operation, $\overline{x}+\overline{y}$, or an AND-operation, $\overline{x}\cdot\overline{y}$ respectively.

3. Transform the OR-operation.

The results of step 1 and step 2 are two dual expressions: either case A)

$$\left\{\begin{array}{l} f = x\cdot y \\ \overline{f} = \overline{x}+\overline{y} \end{array}\right\}$$

or case B)

$$\left\{\begin{array}{l} f = x + y \\ \overline{f} = \overline{x} \cdot \overline{y} \end{array}\right\}$$

One expression is an AND-operation, the other an OR-operation. In the DPDN, the AND-operation is implemented as a series combination, the OR-operation as a parallel combination. At this abstraction level, only the series combination has an internal node. In case A), transform the parallel connection into $\overline{x} \cdot y + \overline{y}$, put network y at the bottom of the x·y connection and share network y between the two branches x·y and $\overline{x} \cdot y + \overline{y}$. In case B), transform the parallel connection into $\overline{x} \cdot \overline{y} + y$, put network $\overline{y}$ at the bottom of the $\overline{x} \cdot \overline{y}$ connection and share network $\overline{y}$ between the two branches $\overline{x} \cdot \overline{y}$ and x·$\overline{y}$+y. Now the DPDN connects the internal node of the series connection to the output node.

4. Repeat the procedure for the logical expressions x and y until the network involves only one transistor.
5. Substitute the results.

For a given schematic of a DPDN, the design procedure translates to (1) identify all networks in series; (2a) open the corresponding parallel connections at the bottom of the network and (2b) connect them to the internal nodes of the series connections; and (3) unroll the network.

FIG. 8 shows the design procedure applied to a complex DPDN. In the final DPDN, both the true and the inverse of a signal control a transistor for every internal node: independent of the input, every internal node is connected to another node, which is either an external node or another internal node, for which both the true and the inverse of a signal control a transistor. As a result independent of the input, every internal node is connected to an external node.

The transistors in the DPDN can only charge the internal nodes as long as they are on. To assure that every cycle the same amount of charge is consumed, this charge time must be constant. That is the case if at every node both the signal and the inverse of the signal control a transistor that loads the node. Whether it is the transistor controlled by the signal or the one controlled by the inverse, the total charge time for the internal nodes is the time needed to precharge the outputs of the preceding gate. This requirement is fulfilled by the special DPDN.

Figure 9:
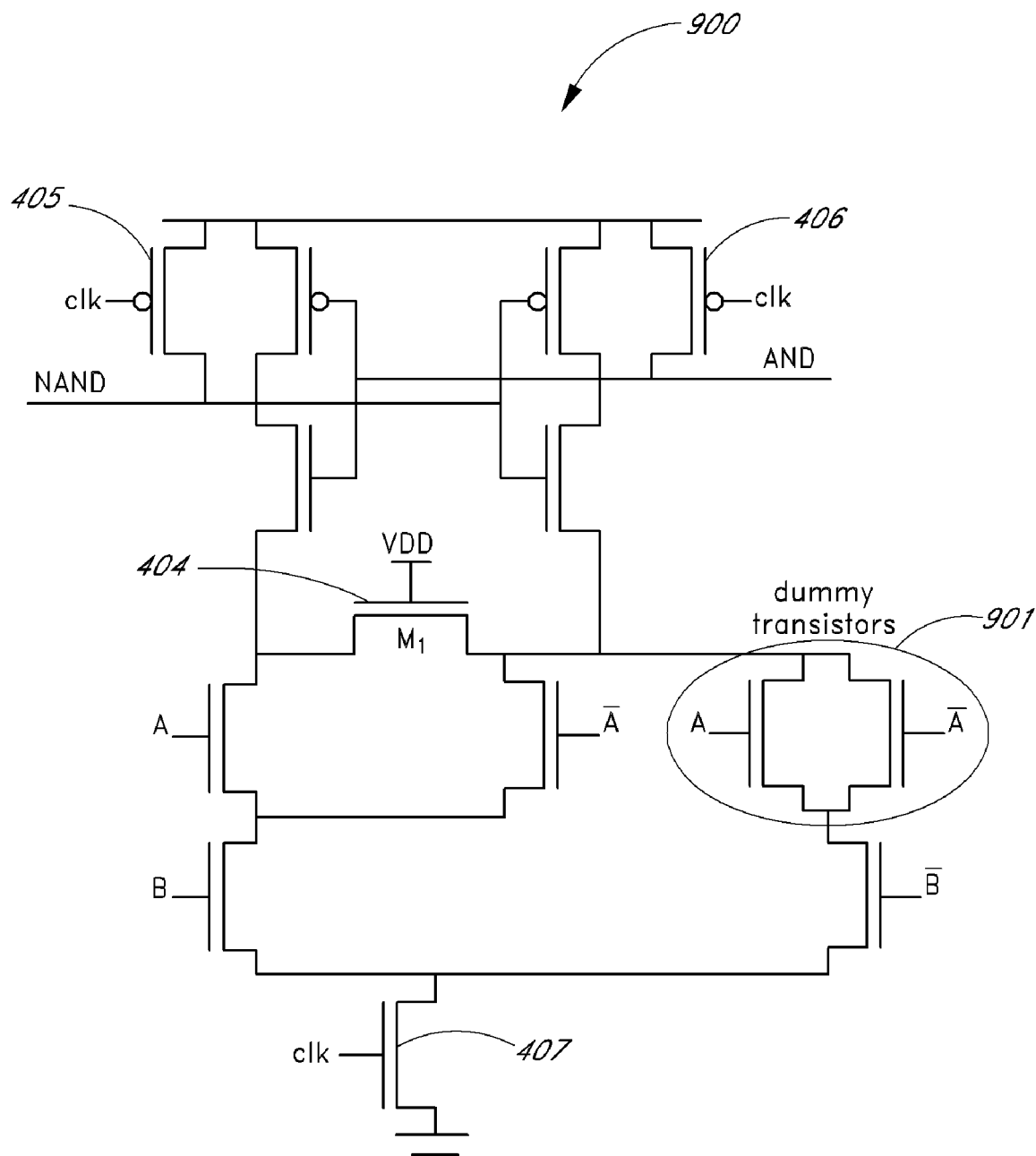
FIG. 9 shows the SABL AND-NAND gate with the enhanced special DPDN.

The SABL logic gate has constant power consumption. Enhancements to the special DPDN, however, are still possible. FIG. 9 shows the SABL AND-NAND gate with the enhanced special DPDN. In the enhanced special DPDN, dummy transistors are inserted in the DPDN. The dummy transistors form a so-called pass-gate, which is a connection between two nodes that is always open for a stable differential input combination. In one embodiment, the dummy transistors are inserted if different discharge paths do not have the same number of transistors, as e.g. is the case with the SABL AND-NAND gate. Advantages are that no evaluation will start before all inputs are stable and that for every possible discharge event, there is a constant resistance in the discharge path.

In the enhanced special DPDN, the evaluation depth of the DPDN is substantially equal for all discharge events. The pass-gate is a connection between two nodes that is always open for a differential input combination and is built by a parallel combination of two transistors driven by both the signal and its complement. The pass-gates are inserted if different discharge paths do not have the same number of transistors, as e.g. is the case with the SABL AND-NAND gate. The pass-gate is controlled by signals that do not yet control a transistor in that particular discharge path.

The introduction of the dummy transistors has two effects. First, there is a constant resistance in the discharge path. As a result, each gate has a constant delay as now both the capacitance C and the resistance R are independent of the inputs. Second, no evaluation will start before all inputs are stable. As a result, the delay of an entire combinatorial logic tree will be constant, as each gate evaluates when the input-pair with the longest delay has switched.

Figure 10:
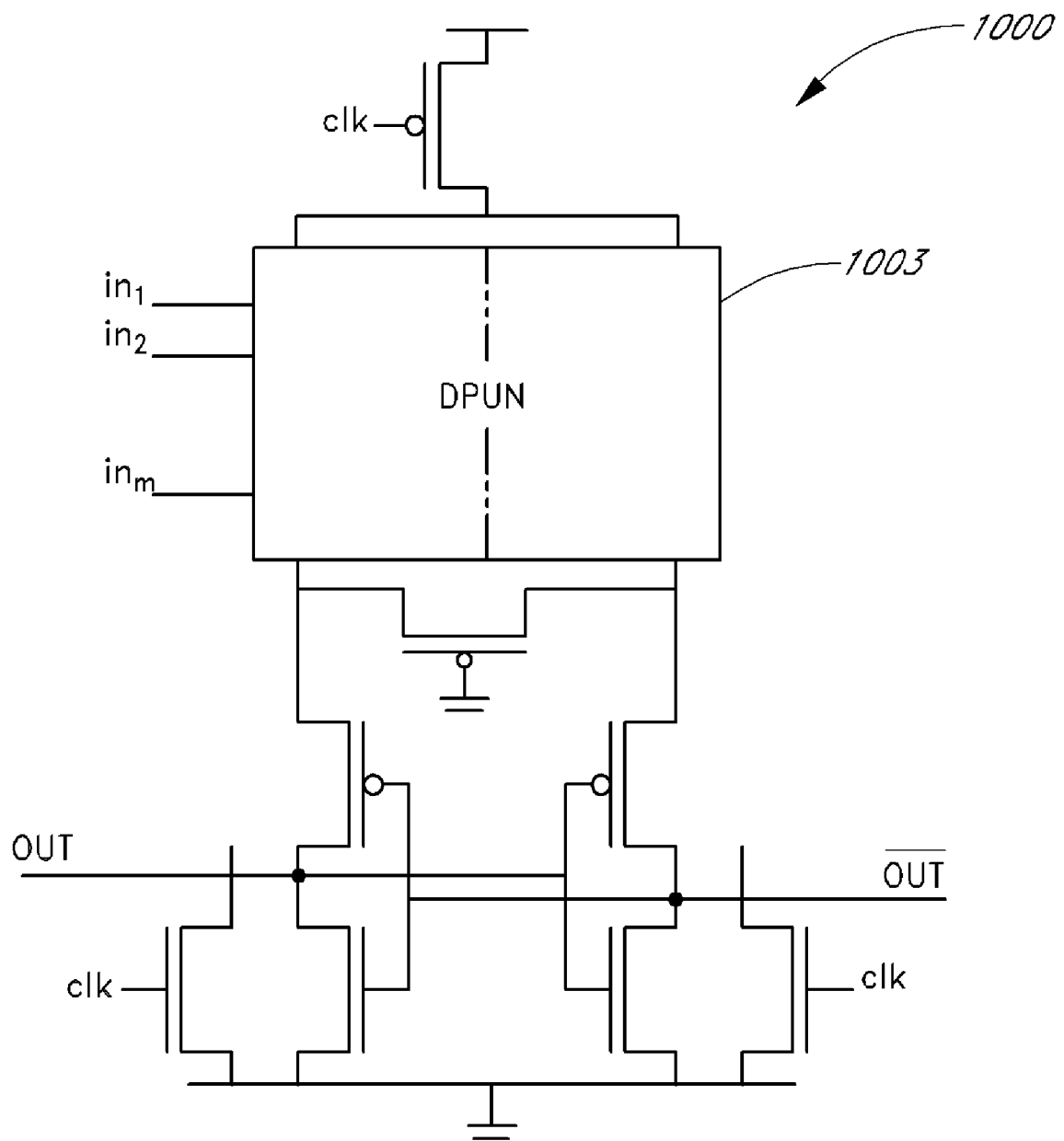
FIG. 10 shows the SABL p-gate.

FIG. 10 shows the SABL p-gate. This gate precharges to ground when the clock-signal is high and evaluates one node to VDD through a Differential Pull Up Network (DPUN) 1003 when the clock-signal is low. Fundamentally, the operation is similar to the basic n-gate.

Figure 11:
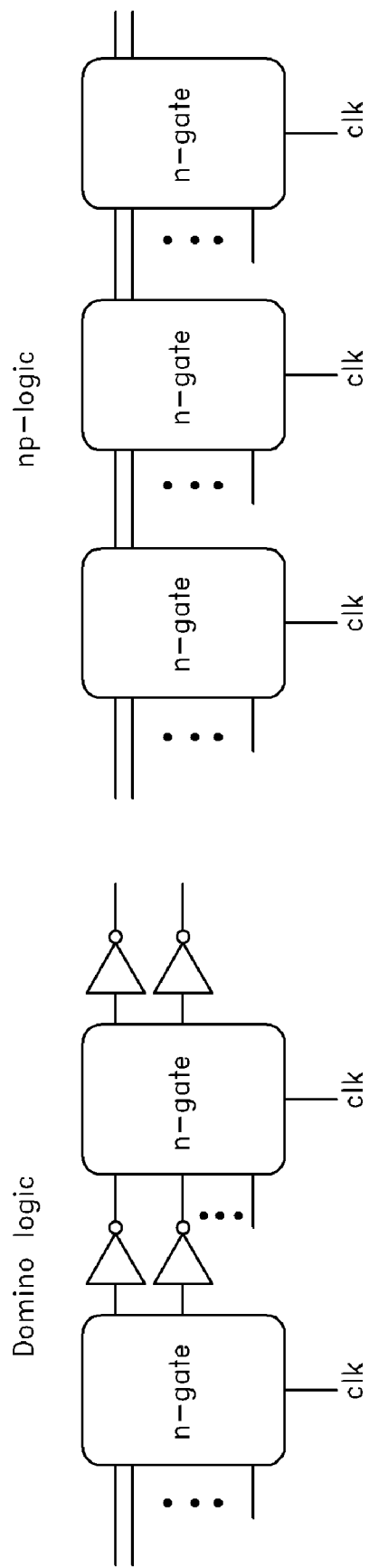
FIG. 11 shows SABL connected using either Domino logic or np-logic.

Domino logic and np-logic are known construction rules to connect dynamic logic gates together. These rules remain applicable to the SABL gates. As it is a dynamic logic, SABL is typically connected using either Domino logic or np-logic. Both are depicted in FIG. 11. In case of Domino logic, the use of static inverters between gates does no harm because in every cycle, one inverter will have a 0-1 event.

For correct operation, all transistors of the conditional path should be off at the onset of the evaluation phase. The use of static gates in Domino Logic does not harm our objective of transition independent power consumption. The pair of inverters fulfills the requirements as exactly one inverter will have a switching event, no internal nodes exist, and both inverters are balanced at the input nodes and at the output nodes.

The SAFF uses a static Set-Reset latch to hold the output value during the precharge phase of the SA. If the flip-flop stores the same value for 2 or more consecutive cycles, the latch will not switch, but keeps its state. Consequently, there is no power consumption in the static latch and the original SAFF is vulnerable to DPA. There are 2 solutions to this: (1) an additional dummy latch that switches when the actual latch does not switch; or (2) a master-slave flip-flop that stores the value during the precharge phase.

The combination of a p-SA and an n-SA, as shown in FIG. 11, acts as a master-slave flip-flop. The p-SA evaluates at the falling edge of the clock-signal and keeps this value till the rising edge, while the n-SA evaluates at the rising edge of the clock-signal and keeps this value till the falling edge. As a result, the value is stored during one entire clock cycle. This is a negative edge triggered flip-flop that stores the input-signal at the instant that the surrounding combinatorial logic will precharge. It releases the output-signal at the instant that the surrounding combinatorial logic will evaluate. For correct operation, the actual precharge time has to be large enough to evaluate the correct differential input. If necessary, the hold time can be fixed by adding a delay Δt has at the input of both the p-SA and the n-SA. This can be done with an extra load capacitance or with static inverters.

For the logic gate, which directly precedes the flip-flop, the rules for cascading of dynamic gates do not hold. Both an n-type and a p-type gate can be directly connected to the flip-flop: the logic gate has a differential output at the negative clock edge. For the logic gates, which directly follow the flip-flop, the rules hold. The flip-flop needs to be followed by p-type gates or by a pair of inverters followed by n-type gates: the second stage of the flip-flop and the gates will both evaluate at the rising clock edge.

Figure 12:
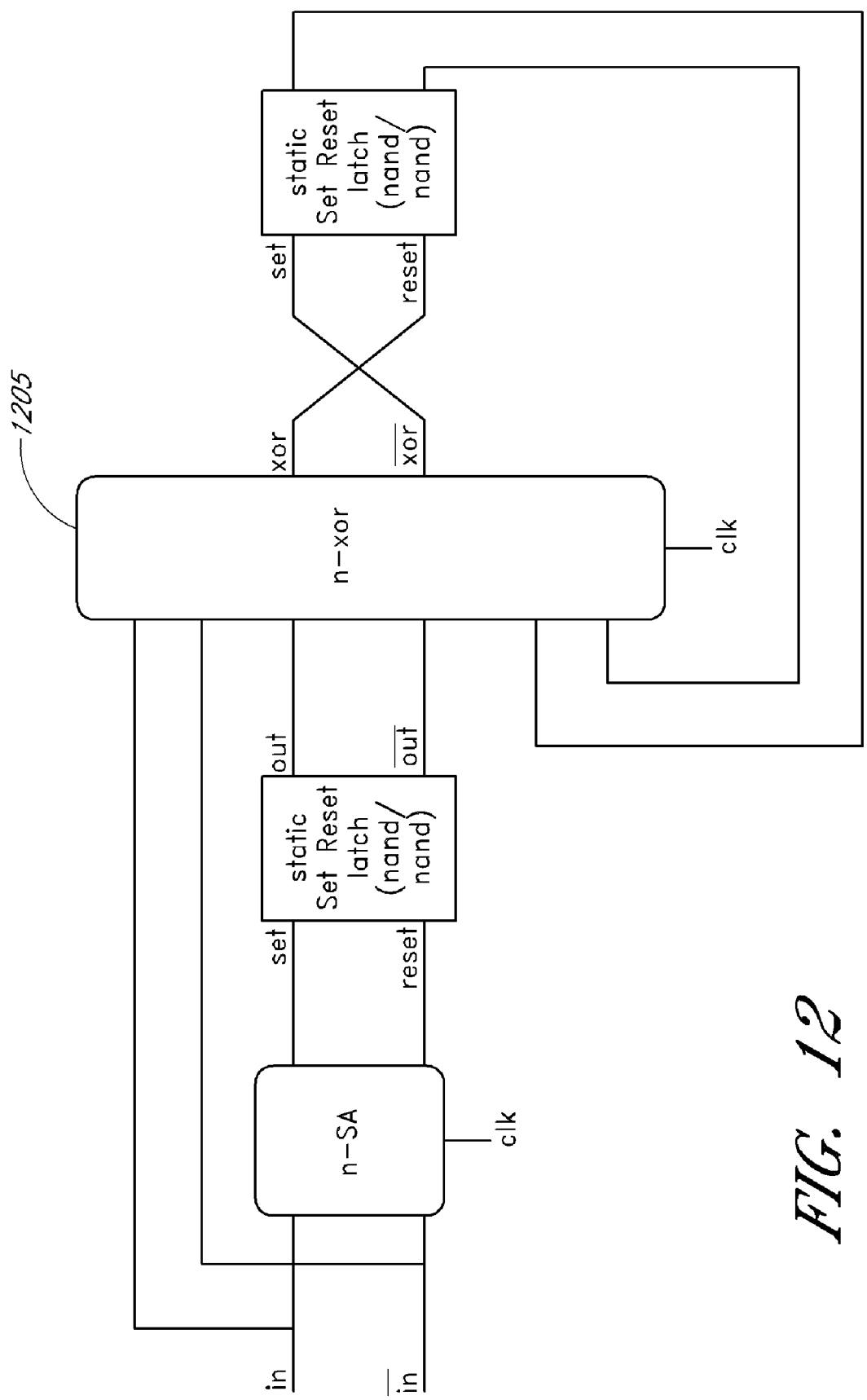
FIG. 12 shows an SABL n-flip-flop with dummy circuitry.

Dummy circuitry can be introduced that switches when the latch does not switch and vice versa. FIG. 12 shows a SABL n-flip-flop with dummy circuitry. This changes the input to the dummy latch when the input to the main SR latch does not change. Vice versa, when the input to the main latch changes, the input to the dummy latch remains the same. A n-flip-flop with dummy circuitry stores the input signal at the rising edge of the clock-signal and keeps this value at the output node till the next rising edge of the clk-signal.

The dual case is the p-flip-flop with dummy circuitry. This circuit is achieved by changing the n-gates in FIG. 12 with p-gates, and the nand/nand static Set Reset latches with nor/nor static Set Reset latches. A p-flip-flop with dummy circuitry stores the input signal at the falling edge of the clk-signal and keeps this value at the output node till the next falling edge of the clk-signal.

Figure 13:
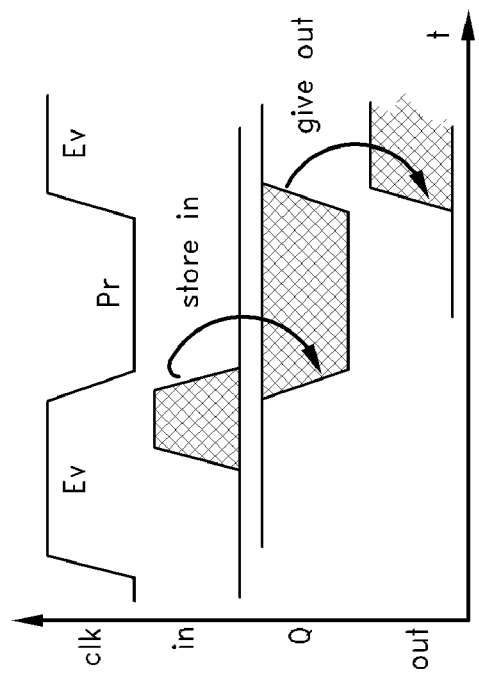
FIG. 13 shows a combination of a p-SA and an n-SA which acts as a master-slave p-flip-flop.
Figure 13:
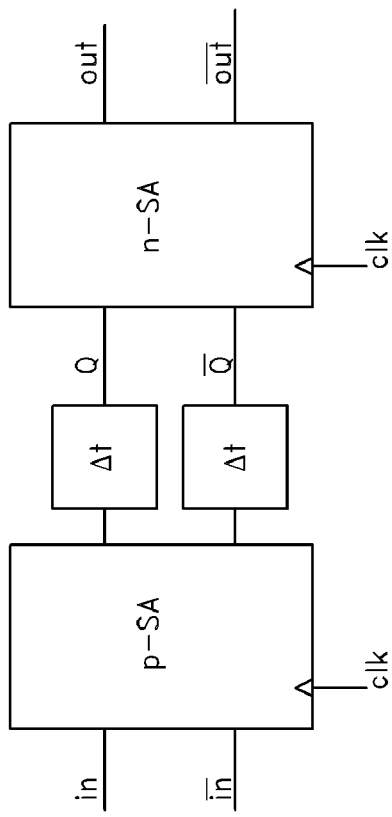

A combination of a p-SA and an n-SA, as shown in FIG. 13, acts as a master-slave p-flip-flop. The p-SA evaluates at the falling edge of clock and keeps this value till the rising edge, while the n-SA evaluates at the rising edge of clock and keeps this value till the falling edge. As a result, the value is stored during one clock cycle. For correct operation, the actual precharge time has to be large enough to evaluate the correct differential input. If the precharge time is not large enough, a delay $\Delta t$ is added at the outputs of the p-SA. This can be done with an extra load capacitance or with static inverters. Note that if the flip-flop is followed by n-gates, both output nodes are inverted.

The Set-Reset latch of the SAFF is static to prevent loss of the output value. However, if the input to the flip-flop does not change, the output of the latch will not change. Consequently there will be no power consumption in this static gate.

The dual case is the master-slave n-flip. This circuit is achieved by interchanging the n-SA and p-SA in FIG. 13. The n-SA evaluates at the rising edge of clock and keeps this value till the falling edge, while the p-SA evaluates at the falling edge of clock and keeps this value till the rising edge. As a result, the value is stored during one clock cycle.

Figure 14:
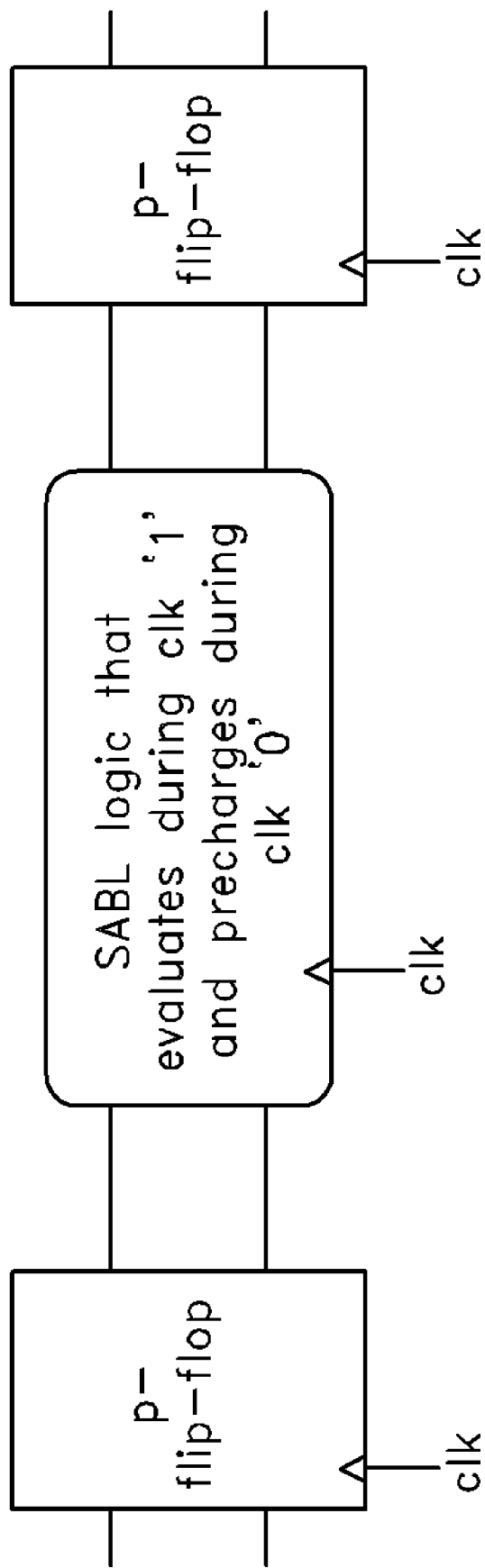
FIG. 14 shows design rules for cascading flip-flops and combinatorial logic.

SABL logic that evaluates during clock '1' and precharges during clock '0' (e.g. n-gates) is cascaded with p-flip-flop's, which store the value at the falling edge of the clock, as shown in FIG. 14.

SABL logic that evaluates during clock '0' and precharges during clock '1' (e.g. p-gates) is cascaded with n-flip-flop's, which store the value at the rising edge of the clock.

Figure 15:
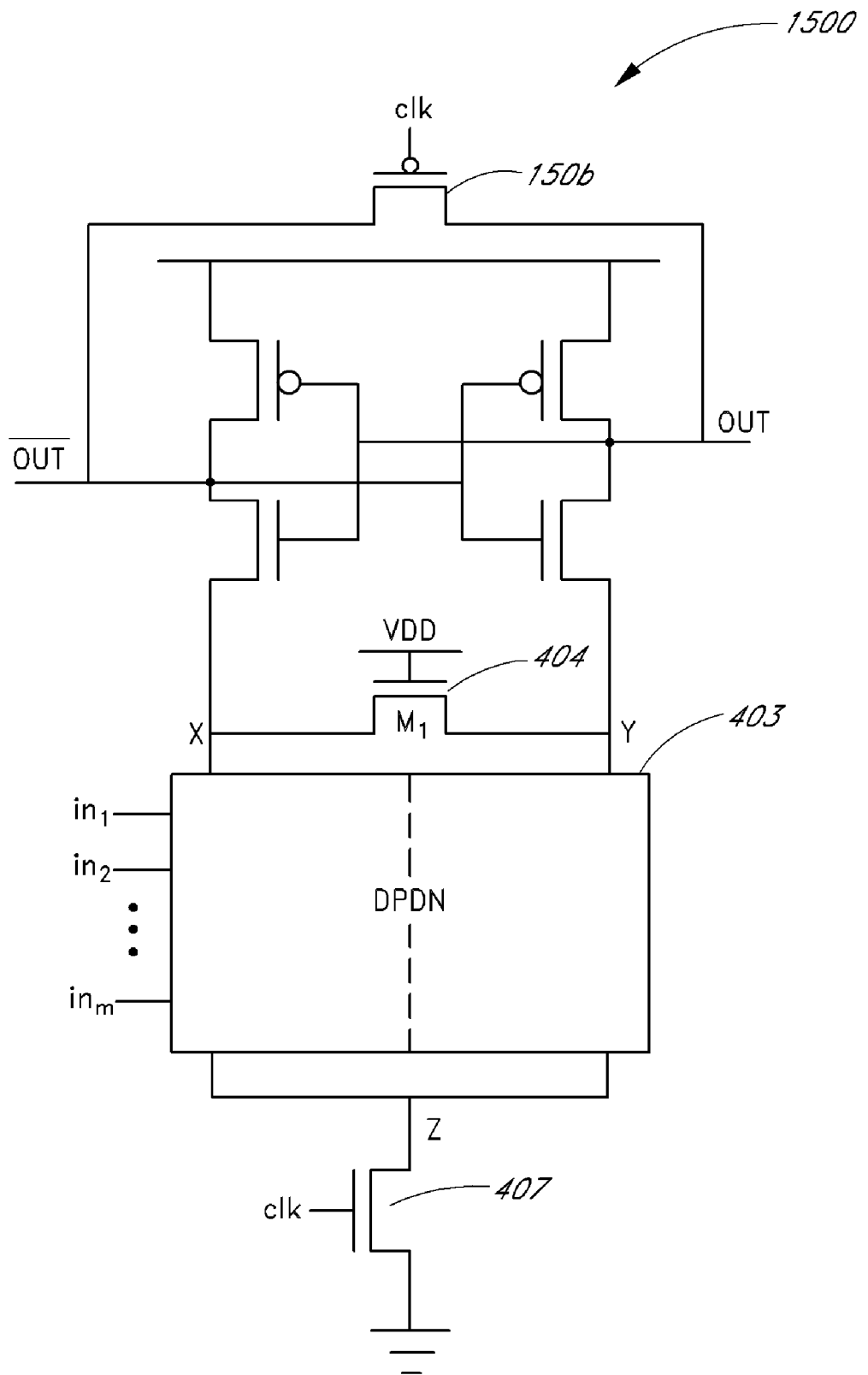
FIG. 15 shows the CRSABL n-gate.

In addition to the SABL gate, a Charge Recycling SABL (CRSABL) gate 1500 is disclosed herein. The CRSABL n-gate 1500 is shown in FIG. 15. The gate is based on the SABL gate. In the CRSABL n-gate, the two clocked transistors 405, 406 that precharge the output and the internal nodes are replaced by one clocked transistor 1506 between the output nodes. When the clock-signal becomes low, which is called the precharge phase, the charge stored at one output node is recycled to partially charge the output and the internal nodes to an intermediate voltage. During the next phase, as the clock-signal becomes high, which is called the evaluation phase, and as soon as a single branch of the DPDN 403 becomes active such that it provides a path to ground, the cross-coupled inverter toggles to one state and provide a stable output.

The above discussions of FIGS. 3 through 14 are applicable to CRSABL. Attention should be given, however, to see that the intermediate voltages do not falsely evaluate the next gate if np-logic is used and that they do not cause static current consumption if domino logic is used. Solutions are high Vt transistors or using circuits that convert the intermediate voltage to a full rail voltage.

In one embodiment, the SABL gates are used in smart cards and other small embedded devices. In these devices, the power can be easily monitored because there are few physical barriers.

The logic style described above not only has a power consumption independent of the input value and sequence but also circuit characteristics, such as leakage current, delay and instantaneous current are independent of inputs and sequences. Therefore, implementing the encryption module in this logic protects it against a wide class of SCA, based on timing, power and leakage information.

Implementing a design in SABL has the additional advantage that the original cryptographic algorithm can be handed over to the hardware engineer without modifications and that subsequently the hardware engineer can make a straightforward logic design. Indeed, whether or not useful data is processed, every SABL gate on the IC evaluates at its particular instance of time.

Timing Attacks (TA's) are a class of cryptanalysis that uses timing information leaked by the encryption module. A careful design, which at all times has a worst case running time, bars the regular TA. Power measurements, however, still provide substantial timing information. They expose idle cycles, which have been inserted to hide conditional branches with unequal lengths, but also the actual delay in a clock cycle. An important variation exists on the time span that the SC-CMOS implementation draws current, or in other words on the time span that switching events take place.

For SABL, however, this is not the case. When desired, idle cycles can be inserted. Every gate has a switching event in every cycle, whether or not useful data is processed. The delay and the instantaneous current of a gate and the complete module are relatively constant and independent of the input vector.

The sub-threshold current, which is also called leakage current, is the current that flows through a transistor with $V_{ds}$ larger than 0 when $V_{gs}$ is smaller than $V_t$. The actual value depends on the terminal voltages, the width and the type of the transistor. This means that the total sub-threshold current of a gate depends on which particular transistors are off, and thus on the state of the gate.

A SABL gate has basically two states: a precharged state and an evaluated state. During precharge, no data values are stored and therefore, no information can be leaked. In the evaluated state, all nodes of the DPDN are at ground. As a result, these transistors have a $V_{ds}$ of 0 and do not carry a sub-threshold current. The only sections that exhibit sub-threshold current, include the cross-coupled inverter pair and the two clocked transistors 405, 406. This circuit has only two states, which, since the circuit is symmetric, are equivalent. As a result the leakage current is independent of the state the circuit is in.

In Differential Fault Analysis (DFA), the attacker tries to force an error in the internal state of the circuit, and subsequently exploit weaknesses of the algorithm during a malfunction. The main counter-measure against DFA is fault detection, where the goal is to shut down the processor and delete any valuable information as soon as possible. While most DFAs seem purely theoretically, Glitch Attacks (GAs) are viewed as a practical DFA. In a GA, the clock frequency is temporarily increased with the intention to force a state-bit or a selected conditional branch by not giving enough time for all calculations to complete.

SABL can detect GA's. The enhanced DPDN 503 only evaluates if all incoming signals are stable. If at the falling edge, some input signals are not differential, which can be detected with a ready signal, the clock frequency has been increased and the circuit should be put in the alarm state. Since the delay of the encryption module is independent of the input vector, the critical path has always the longest delay: the detection only needs to be performed at the receiving flip-flop of the critical path. Good design practice is to create on purpose a critical path inside a DFA detection module.

The flow of electric charges produces an electromagnetic field. Electromagnetic Analysis (EMA) is the equivalent of a power attack but instead uses the electromagnetic fields generated by the (dis)charging gates as the side channel information. There are, however, differences. A power attack only has access to the global power consumption. An EMA, however, can do measurements that are confined to a small area of the security IC. On the other hand, a power attack can be mounted rather quickly with off-the-shelf devices, whereas an EMA requires special probes and an advanced measurement setup.

SABL withstands EMA. The instantaneous current of a SABL gate is independent of the switching events. As a result, the electromagnetic fields, which are generated by the electric charge flowing through the VDD and the ground lines, are independent of the switching events. In addition, the charge flows also through either of the two differential output wires. These interconnects are routed in the same environment and over the same distance. Therefore, the electromagnetic fields of these wires are also independent of the output transitions.

Although various embodiments have been described above, other embodiments will be within the skill of one of ordinary skill in the art. Thus, the invention is limited only by the claims.

What is claimed is:

1. A flip-flop, comprising:

an inverted input and a non-inverted input provided to an SA logic gate having first inverted and first non-inverted outputs, said first inverted and first non-inverted outputs provided to a first set-reset latch having second inverted and second non-inverted outputs;

said inverted input, said non-inverted input, said second inverted output and said second non-inverted output provided to an SABL exclusive-or gate having inverted and non-inverted exclusive-OR outputs; and said inverted and non-inverted exclusive-or outputs provided to a second set-reset latch having third inverted and third non-inverted outputs, said third inverted and third non-inverted outputs provided to said SABL exclusive-OR.

2. The flip-flop of claim 1, wherein said SABL exclusive-or comprises a DPDN.

3. The flip-flop of claim 1, wherein said SABL exclusive-or comprises a DPUN.

* * * * *

UNITED STATES PATENT AND TRADEMARK OFFICE
CERTIFICATE OF CORRECTION

PATENT NO. : 7,692,449 B2 Page 1 of 1
APPLICATION NO. : 12/191144
DATED : April 6, 2010
INVENTOR(S) : Ingrid M. Verbauwhede et al.

It is certified that error appears in the above-identified patent and that said Letters Patent is hereby corrected as shown below:

At Page 2, (Item 56), Column 1, Line 5, under Other Publications, change "3," to --4,--.
At Column 1, Line 65, change "itself" to --itself.--.
At Column 7, Line 14 (Approx.), Change " $\overline{x} \cdot \overline{y} + y,$ " to -- $x \cdot \overline{y} + y,$ --.

Signed and Sealed this
Twelfth Day of June, 2012

David J. Kappos
*Director of the United States Patent and Trademark Office*